(12) United States Patent
Morrill et al.

(10) Patent No.: US 12,221,074 B2
(45) Date of Patent: Feb. 11, 2025

(54) BICYCLE RACK AND LIGHTING ASSEMBLY

(71) Applicant: Byk-Rak, Division of Hogan Mfg., Inc., Escalon, CA (US)

(72) Inventors: Daniel D. Morrill, Owosso, MI (US); Charles R. Rodman, Eden Prairie, MN (US)

(73) Assignee: Byk-Rak, Division of Hogan Mfg., Inc., Escalon, CA (US)

( * ) Notice: Subject to any disclaimer, the term of this patent is extended or adjusted under 35 U.S.C. 154(b) by 0 days.

(21) Appl. No.: 17/833,049

(22) Filed: Jun. 6, 2022

(65) Prior Publication Data

US 2022/0410810 A1    Dec. 29, 2022

Related U.S. Application Data

(60) Provisional application No. 63/214,074, filed on Jun. 23, 2021.

(51) Int. Cl.
*B60R 9/10* (2006.01)

(52) U.S. Cl.
CPC ..................... *B60R 9/10* (2013.01)

(58) Field of Classification Search
CPC ........................................... B60R 9/10
USPC ....................................... 224/924
See application file for complete search history.

(56) References Cited

U.S. PATENT DOCUMENTS

| | | | |
|---|---|---|---|
| 3,176,903 A | 4/1965 | Farley | |
| 3,367,548 A | 2/1968 | Cooper | |
| 4,171,077 A * | 10/1979 | Richard, Jr. | B60R 9/10 224/535 |
| 5,692,659 A * | 12/1997 | Reeves | B60R 9/06 224/536 |
| 6,095,387 A | 8/2000 | Lipscomb | |
| 6,322,238 B1 | 11/2001 | Barr | |
| 6,968,986 B1 | 11/2005 | Lloyd et al. | |
| 7,806,308 B2 | 10/2010 | Gunn | |
| 7,854,358 B2 | 12/2010 | Bergerhoff et al. | |
| 7,854,359 B2 * | 12/2010 | Gunn | B60R 9/10 411/513 |
| 7,900,801 B2 * | 3/2011 | Huang | B60R 9/10 224/500 |
| 9,039,263 B2 * | 5/2015 | Hofmann | B60R 9/06 362/549 |
| 9,340,165 B2 * | 5/2016 | Ziola | B60R 9/06 |
| 9,815,416 B2 | 11/2017 | Cha et al. | |
| 11,608,002 B2 * | 3/2023 | Ellis | B60R 5/041 |
| 2010/0089957 A1 * | 4/2010 | Barth | B60R 9/06 224/539 |

(Continued)

FOREIGN PATENT DOCUMENTS

| | | | | |
|---|---|---|---|---|
| DE | 4320975 A1 | 1/1995 | | |
| DE | 202004003423 U1 * | 6/2004 | | B60R 9/06 |

(Continued)

*Primary Examiner* — Scott T McNurlen

(74) *Attorney, Agent, or Firm* — CHRISTENSEN O'CONNOR JOHNSON KINDNESS PLLC

(57) ABSTRACT

The present teachings provide a bicycle rack comprising: one or more cradles that receive a bicycle, the one or more cradles extending along a cradle plane; one or more light assemblies that provide light along a light plane; wherein the light plane and the cradle plane are at an angle relative to one another so that the light plane extends under the cradle plane.

20 Claims, 7 Drawing Sheets

(56) References Cited

U.S. PATENT DOCUMENTS

| | | |
|---|---|---|
| 2011/0253758 A1 | 10/2011 | Bertrand |
| 2015/0282346 A1 * | 10/2015 | Ganim ................. H05K 5/0226 |
| | | 40/544 |
| 2021/0147022 A1 | 5/2021 | Kuschmeader et al. |
| 2022/0144181 A1 * | 5/2022 | Garai Abrisketa ....... B60R 9/10 |
| 2022/0176886 A1 * | 6/2022 | Sailer ........................ B60R 9/06 |

FOREIGN PATENT DOCUMENTS

| | | | |
|---|---|---|---|
| DE | 102007023495 A1 * | 11/2008 | ............... B60R 9/06 |
| DE | 102013210825 A1 | 12/2014 | |
| DE | 202019103944 U1 * | 8/2020 | ............... B60R 9/06 |
| EP | 2833557 B1 | 1/2016 | |
| KR | 100773082 B1 * | 11/2007 | |
| WO | 1994003346 A1 | 2/1994 | |
| WO | 2016028283 A1 | 2/2016 | |

* cited by examiner

US 12,221,074 B2

BICYCLE RACK AND LIGHTING ASSEMBLY

CROSS-REFERENCE TO RELATED APPLICATION(S)

This application claims priority to and the benefit of U.S. Provisional Application Patent Ser. No. 63/214,074, filed Jun. 23, 2021, the entire disclosure of which is hereby incorporated by reference.

TECHNICAL FIELD

This disclosure relates generally to a bicycle rack, a lighting assembly that illuminates a region around the bicycle rack, and a sensor to warn a driver about a position of the bicycle rack and to assist a driver in seeing people and/or objects in a path of the vehicle or alert the driver that the bicycle rack is in the deployed position.

BACKGROUND

Typical bicycle racks include one or more cradles that receive and carry a bicycle. These cradles are movable between a stored position when not in use and a deployed position where the one or more cradles are configured to receive a bicycle.

SUMMARY

Disclosed herein are implementations of a bicycle rack and light assemblies. The bicycle rack has been modified to include one or more lighting assemblies. The bicycle rack has been modified so that cradles of the bicycle rack, a pivot bracket, a frame, or a combination thereof are located so as to not impede light from the light assemblies.

The present teachings provide: a bicycle rack comprising: one or more cradles and one or more light assemblies. The one or more cradles receive a bicycle, and the one or more cradles extending along a cradle plane. The one or more light assemblies that provide light extending along a light plane. The light plane and the cradle plane are at an angle relative to one another so that the light plane extends under the cradle plane.

The present teachings provide a bicycle rack. The bicycle rack includes one or more cradles, one or more light assemblies, and one or more sensors. The one or more cradles receive a bicycle, and the one or more cradles extending along a cradle plane. The one or more light assemblies provide light along a light plane. The one or more sensors sense a position of the bicycle rack, an operation status of the one or more light assemblies, or both.

A bicycle rack comprising one or more cradles, a bracket assembly, and one or more light assemblies. The one or more cradles receive a bicycle, and the one or more cradles extending along a cradle plane. The bracket assembly is configured to connect the bicycle rack to a vehicle. The one or more light assemblies connected to the bracket assembly and extending coplanar with the bracket assembly to provide light along a light plane.

Additional teachings are described in further detail below.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
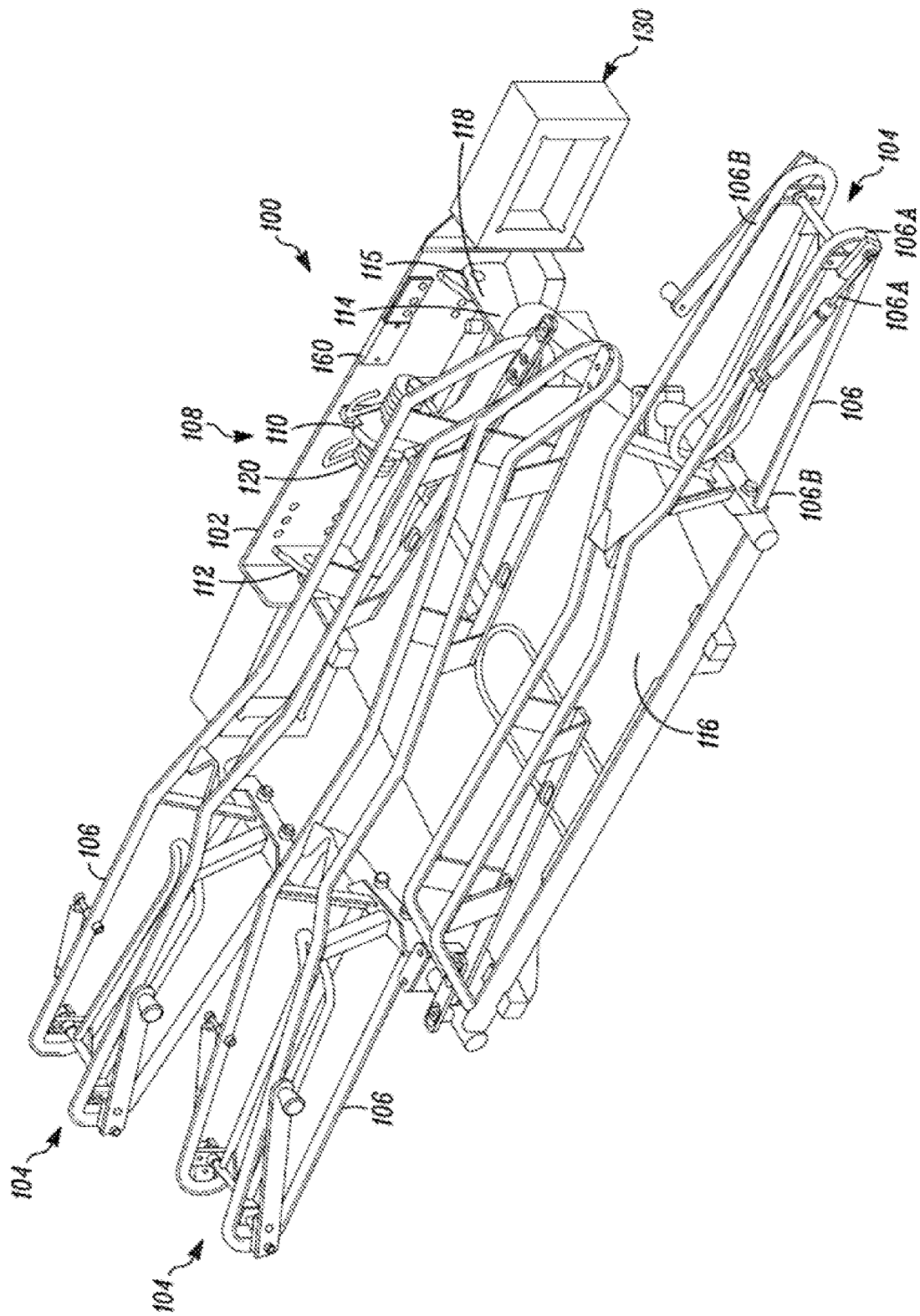
FIG. 1 is an isometric view of a bracket assembly including light assemblies in a deployed position.

FIG. 1 is a perspective view of a bicycle rack 100. The bicycle rack 100 is movable between a deployed position (as shown) and a stored position (See, e.g., FIGS. 2 and 3). The bicycle rack 100 in the deployed position is rotated about a bracket assembly 102 so that cradles 104 are exposed to receive bicycles or similar wheeled devices that are too large to fit within a vehicle. The bicycle rack 100 may include one or more, two or more, three or more, or four or more of the cradles 104.

The cradles 104 include rails 106 that are configured to receive a wheel of a bicycle (not shown). The rails 106 may prevent a bicycle from moving side to side, tipping over, moving forward, moving backwards, or a combination thereof. The rails 106 may allow a wheel to move in a first direction so that a bicycle may be inserted into the cradle 104 and then restrict the bicycle from moving in a second direction. The rails may be solid, hollow, round, flat, oval, or a combination thereof. The rails 106 of the cradle 104 may move between a stored position and a deployed position when the bicycle rack 100 is rotated about the bracket assembly 102 so that the cradles 104 flatten for storage.

The rails 106 of the cradle 104 may pivot downward so that substantially all of the rails 106 of the cradle 104 are coplanar in the stored position (e.g., all located within a first plane). The rails 106 may then rotate upward to form a second plane where a portion of the rails 106 extend from the first plane into the second plane forming the deployed position. The rails 106 may have a portion (e.g., vertically extending rails) that extends between the first plane and the second plane to support another portion of the rails 106 (e.g., horizontally extending rails). The rails 106 may be a combination of vertical rails 106A (e.g., rails that extend between a first plane and a second plane) and horizontal rails 106B (e.g., rails that extend substantially within the first plane or the second plane). The horizontal rails 106B may be connected together via the vertical rails 106A. The vertical rails 106A may be static and immobile. The vertical rails 106A may pivot so that first ones of the horizontal rails 106B may move relative to second ones of the horizontal rails 106B. The vertical rails 106A may be curved, straight, angled, or a combination thereof.

The bracket assembly 102 may include one or more cams 108. The bracket assembly 102 may include a single cam 108. The one or more cams 108 may include one or more notches 110. The one or more notches 110 may assist in locking the bicycle rack 100 in the stored position or the deployed position. The one or more notches 110 may receive a locking member (not shown) that locks the bicycle rack 100 in the stored position or the deployed position. The notches 110 may be located at predetermined locations to determine an orientation of the bicycle rack 100, the cradles 104, or both. The notches 110 may be an absence of material. The notches 110 may be located in predetermined locations so that when the locking member is moved into position relative to the notches 110, the bicycle rack 100 is locked in the stored position or the deployed position. The cam 108 may be located between two opposing bracket arms 112.

The bracket arms 112 may extend from the bracket assembly 102. The bracket arms 112 may be static, include a pivot point, or both. The bracket arms 112 may be connected to a wall of the bracket assembly 102 and extend from the wall. The bracket arms 112 may extend from end regions of the bracket assembly 102. The bracket arms 112 may book end the cradle 104. The bracket arms 112 may be static and allow cradle arms 114 to support rotation of the bicycle rack 100.

The notches 110 and the cradle arms 114 may work in conjunction to secure the bicycle rack 100 in the stored position, the deployed position, or both. The cradle arms 114 may rotate between the stored position and the deployed position. The cradle arms 114 in the deployed position may contact a wall of the bracket assembly 102 so that movement of the bicycle rack 100 is restricted, prevented, or both. The wall of the bracket assembly 102 may act as a stop for the cradle arms 114. The bracket arms 114 may have a predetermined length that determines an angle of the bicycle rack 100 relative to a planar surface such as the ground in the stored position and/or the deployed position. The bracket arms 114, the notches 110, or both may have a size and position to determine an orientation of the bicycle rack 100, the cradles 102, or both in the stored position, the deployed position, or both. The cradle arms 114 include a contact edge 115.

The contact edge 115 is configured to contact the wall of the bracket assembly 102. The contact edge 115 may be flat, angled, include projections, or a combination thereof. The contact edge 115 may be flat relative to the wall of the bracket assembly 102 so that when the contact edges 115 and the wall are in communication, the bicycle rack 100 is secured in the deployed position. The contact edge 115 may be angled relative to a base 116 of the bicycle rack 100.

The base 116 may be a planar portion of the bicycle rack 100 that supports the cradles 104, is connected to the rails 106, prevents debris from contacting contents of the bicycle rack 100, or a combination thereof. The base 116 may be planar. The base 116 may be angled relative to the ground. The angle of the base 116 relative to the ground may be determined based upon a length of the bracket arms 114, a shape or size of the contact edge 115, or both. For example, if the contact edge 115 and the base 116 are perpendicular to each other, then the base 116 will extend substantially parallel to the ground. In another example, if a portion of the contact edge 115 is extended such that the contact edge 115 forms a 2 degree angle (or a 92 degree angle) relative to the base 116, then the base 116 may be lifted by 2 degrees such that the base 116 extends 2 degrees from parallel relative to the ground. The base 116 is movable by the cradle arms 114 rotating relative to the bracket arms 112 about respective pivot members 118.

The pivot members 118 function to rotatably connect the cradle arms 114 to the bracket arms 112. The pivot members 118 may include any device that provides a bearing surface to allow for pivotable movement while restricting motion along an axis of the pivot members 118. The pivot members 118 may include a pin, a bearing, a threaded member, a bolt, a screw, a rivet, a nail, a cotter pin, or a combination thereof. The pivot members 118 may include a portion that moves with the cradle arms 114. The pivot members 118 may move with the cradle arms 114 or remain static with the bracket arms 112. The pivot members 118 may move in some instances and be static in some instances depending on an amount of friction acting on the pivot members 118. The bracket assembly 102 also includes bias members 120 that assist in moving the bicycle rack 100 between the stored position and the deployed position.

The bias members 120 may assist in lowering the bicycle rack 100 so that the bicycle rack 100 does not drop. The bias members 120 may assist a user in raising the bicycle rack 100 so that little strength is required to move the bicycle rack 100 into the stored position. The bias members 120 may include a spring, a compression spring, a tension spring, a weight and pulley system, an elastomeric member, a rubber member, or a combination thereof. The bias members 120 may store energy to assist a user in moving the bicycle rack 100. When the bias members 120 move the bicycle rack 100 to the stored position, the light assemblies 130 are exposed.

The light assemblies 130 functions to provide light forward of a vehicle, the bicycle rack 100, or both. The light assemblies 130 may provide light to the bicycle rack 100 so that a user may see the bicycle rack 100 in the dark to assist the user in storing a bicycle or to see a region around the bicycle rack 100. The light assemblies 130 may be connected to the bracket assembly 102, a bumper of a vehicle, or both. The light assemblies 130 may be electrically connected to a vehicle, lights of a vehicle, a switch within the vehicle, an automatic sensor, or a combination thereof. The light assemblies 130 may be coplanar with the base 116, the bracket assembly 102, or both. The bracket assemblies 102 may hang or otherwise be positioned for installation on a vehicle at a location below or under all or a portion of the base 116, the bracket assembly 102, or both. The light assemblies 130 may be located a sufficient distance under the base 116, the bracket assembly 102, or both so that the base 116 does not interfere with light emitted from the light assemblies 130 when installed on the vehicle.

The bicycle rack 100 further includes a sensor 160. The sensor 160 is configured to warn a driver of a vehicle when the bicycle rack 100 is in the deployed position (e.g., down). The sensor 160 functions to provide a warning to a driver when there are no bicycles on the bicycle rack 100 and the bicycle rack 100 is in the deployed position. For example, when the bicycle rack 100 is down and there are no bicycles on the bicycle rack 100, it may be difficult for a driver to see the bicycle rack 100. The sensor 160 may provide a warning that the bicycle rack 100 is in the deployed position so that the driver does not inadvertently make contact with an object in front of the vehicle. The sensor 160 may alert a driver that the bicycle rack 100 is in a deployed position with no bicycles thereon so that a user may move the bicycle rack 100 into the stored position. The sensor 160 may include multiple sensors (not shown) and be configured to provide an operation status of the one or more light assemblies 130 (e.g., on or off). The sensor 160 may prove an auditory signal, a visual signal, a haptic signal, or a combination thereof to warn a driver that the bicycle rack 100 is in the deployed position, in the deployed position without a bicycle, or both.

Figure 2:
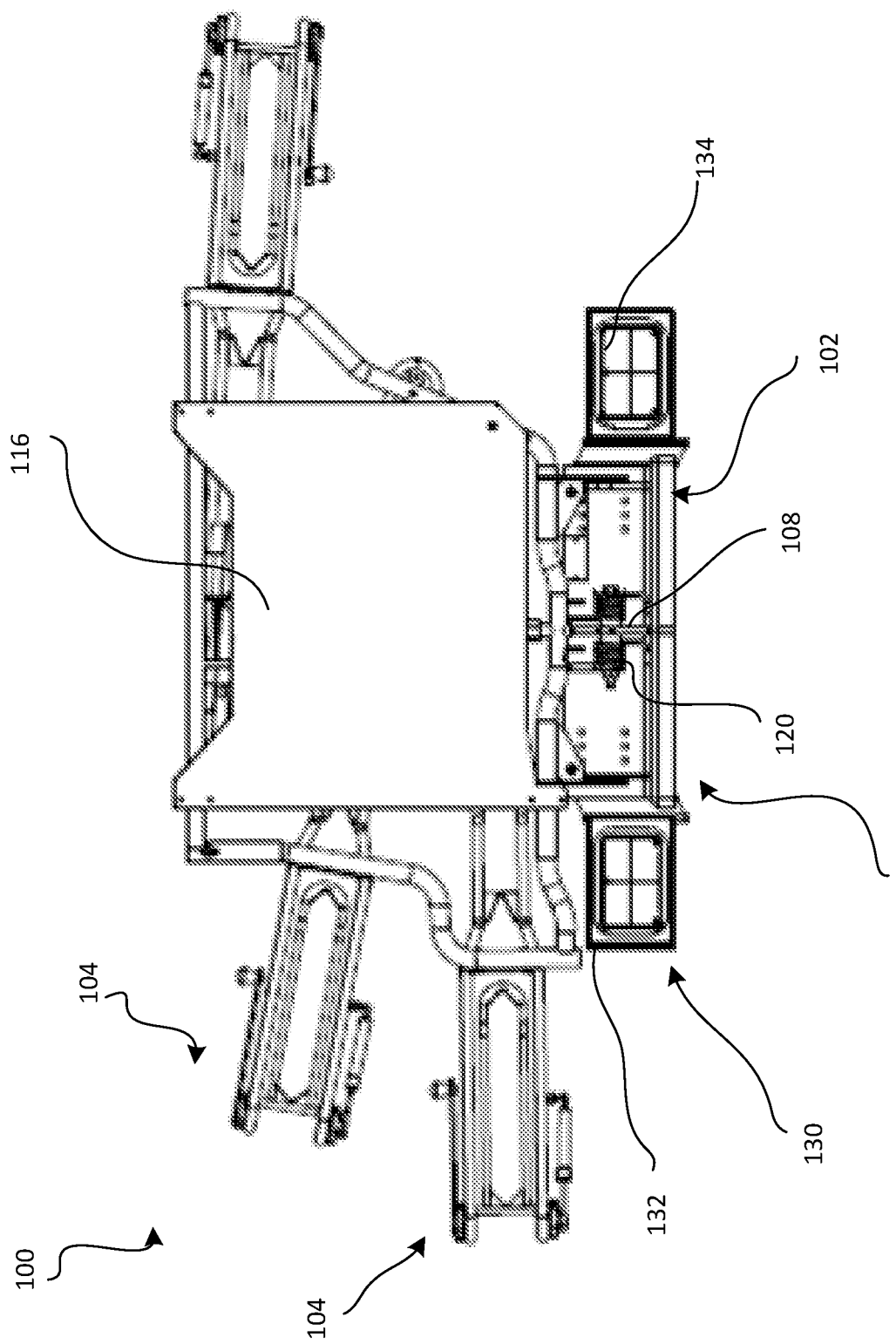
FIG. 2 is a front view of the bracket assembly and the light assemblies of FIG. 1 in a stored position.

FIG. 2 is a front view of the bicycle rack 100 of FIG. 1. The bicycle rack 100 is in the stored position where the bicycle rack 100 extends in front of a vehicle (not shown). In the stored position, the bicycle rack 100 is substantially perpendicular to the ground. The cradles 104 are located between the vehicle and the base 116. As shown, the bracket assembly 102 and the light assemblies 130 are exposed when the bicycle rack 100 is in the stored position. The bicycle rack 100 is locked via the cam 108 so that the bicycle rack 100 does not move (e.g., is maintained in the stored position or the deployed position). The bias members 120 may assist in retaining the bicycle rack 100 in the stored position, and the bias members 120 may be under compression, tension, or both.

The light assemblies 130 include light frames 132 that may be part of the bracket assembly 102. The light frames 132 are located on opposing sides of the bracket assembly 102. The light frames 132 may be connected to both the bracket assembly 102 and a vehicle so that the light frames are free of bouncing independent of the vehicle, the bracket assembly 102, or both as the vehicle moves. This improves operation of the light assemblies 130 as unintended vibrations are reduced. For example, the light frames 132 may be grounded to the bracket assembly 102, and the bracket assembly 102 may be grounded to a chassis or bumper of the vehicle so that the light frames 132 are free of independent movement, bouncing, or both. The light frames 132 may include one or more lights 134.

The lights 134 function to illuminate a forward direction of the vehicle. The lights 134 may be or include a direct light, a reflected light, or both. The lights 134 may be or include a laser diode, a glowing phosphor, a filament bulb, a halogenated light, an xenon light, an incandescent bulb, a fluorescent light, a compact fluorescent lamp, a halogen lamp, a light emitting diode (LED), a high intensity discharge lamps (HID), halogen lights, xenon lights, a phosphorous bulb, or a combination thereof. The lights 134 may be any light that illuminates a predetermined area.

Figure 3:
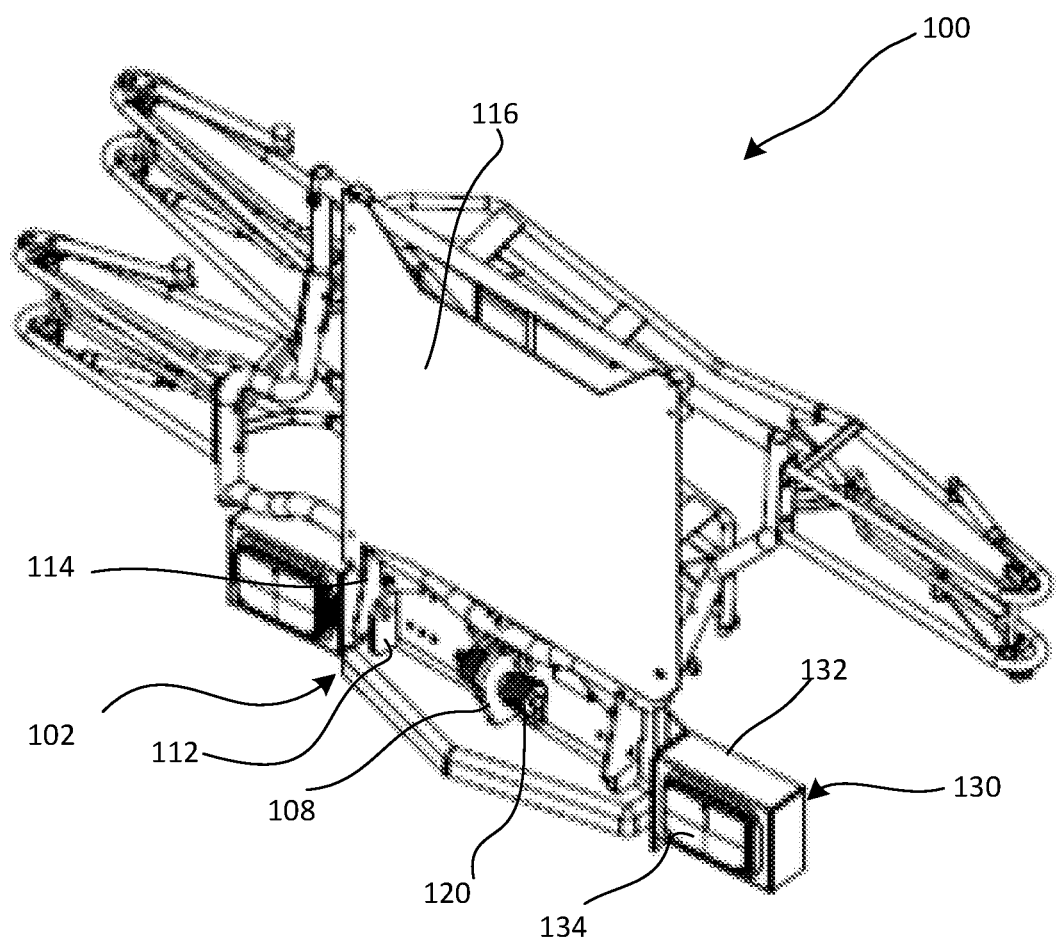
FIG. 3 is a front perspective view of the bracket assembly and the light assemblies of FIG. 1 is a stored position.

FIG. 3 is a perspective view of the bicycle rack 100 of FIG. 1 in the stored position. In the stored position, the base 116 is elevated so that the light assemblies 130 are completely unobstructed. As shown, the bracket assembly 102 is exposed so that the cam 108, the bracket arms 112, the cradle arms 114, and the bias members 120 are exposed. The light assemblies 130 are shown on both sides of the bracket assembly 102 and are directed in a forward direction. Each one of the light assemblies 130 includes a light frame 132 connected to the bracket assembly 102 and housing a light 134.

Figure 4:
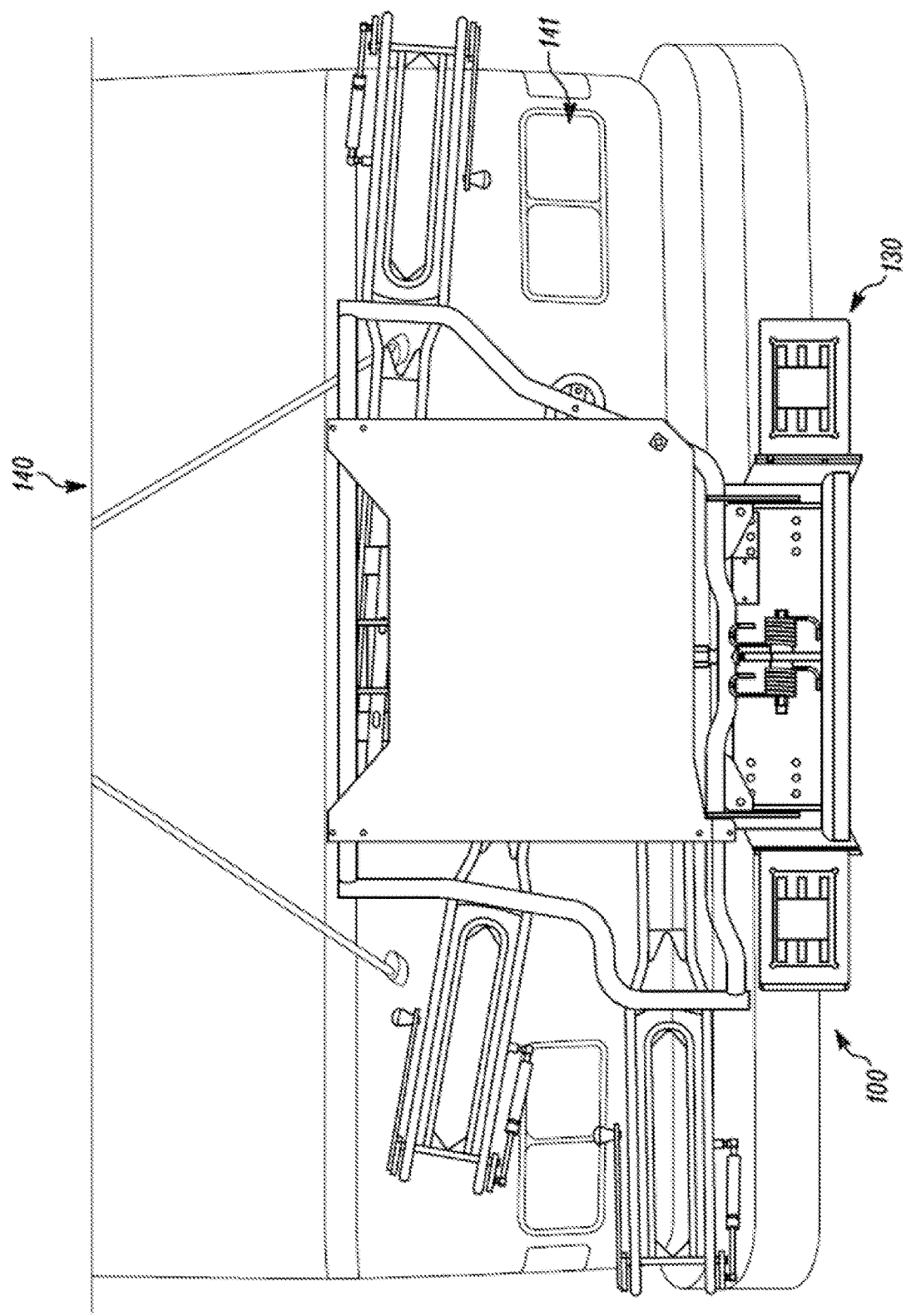
FIG. 4 is a front view of the bracket assembly and the light assemblies in a stored position.

FIG. 4 illustrates the bicycle rack 100 and the light assemblies 130 connected to a forward end of a vehicle 140 and being in a stored position. In this example, the vehicle 140 is a commercial bus that includes headlamps 141. Light emitted by the light assemblies 130 and the headlamps 141 are unobstructed by the bicycle rack 100 in the stored position. The light emission from the light assemblies 130 and the headlamps 141 can be coordinated, for example, by establishing electronic communication between the light assemblies 130 and the vehicle 140. In another example, if the vehicle 140 turns on the headlamps 141, the light assemblies 130 can be illuminated. In yet another example, a driver of the vehicle 140 can engage a switch to selectively illuminate the light assemblies 130.

Figure 5:
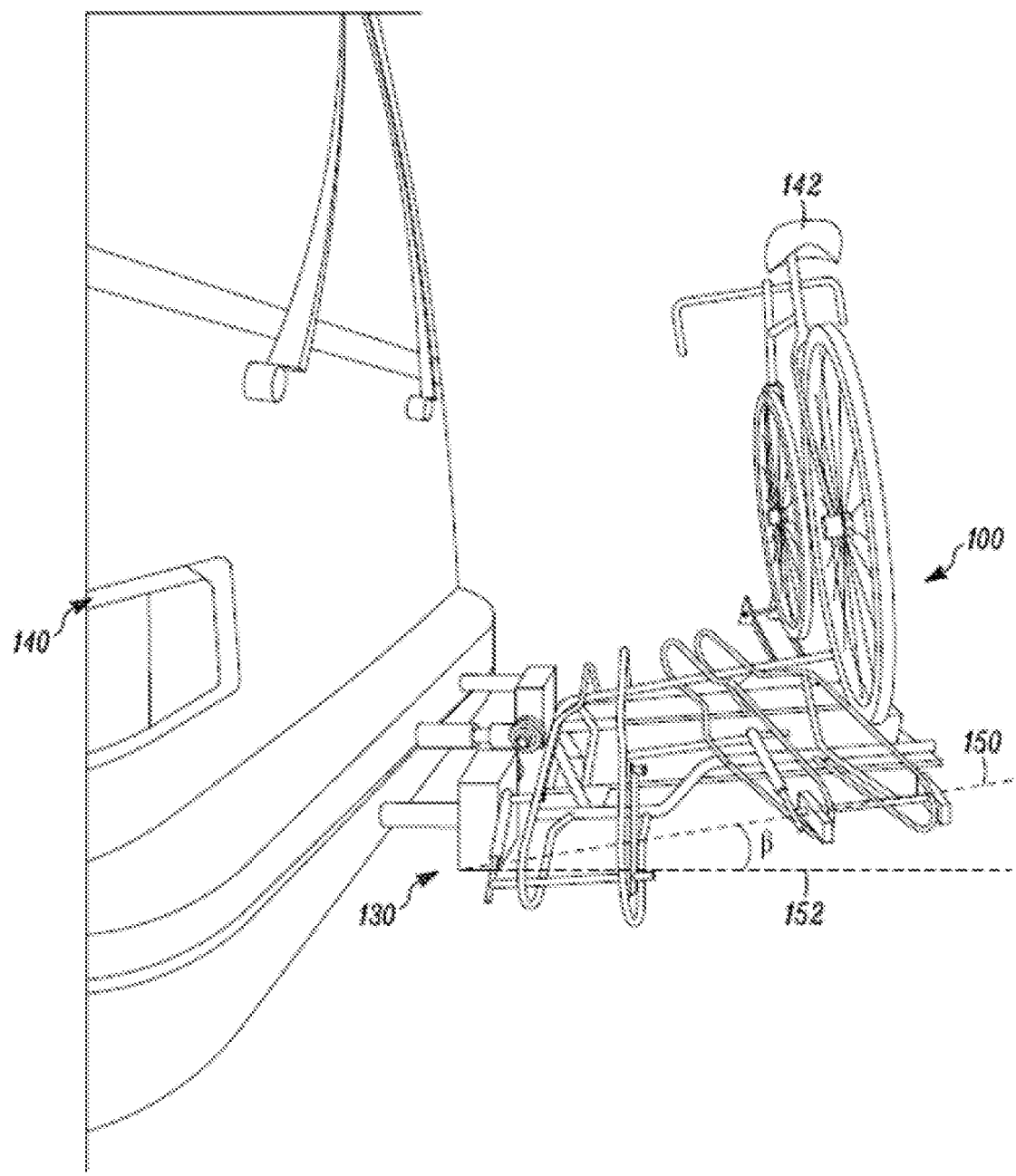
FIG. 5 is a side view of the bracket assembly of FIG. 4 extending from a vehicle.

FIG. 5 is a side view of FIG. 4 with the bicycle rack 100 and the light assemblies 130 in a deployed position extending from the vehicle 140. The bicycle rack 100 includes a bicycle 142 being transported by the vehicle 140. The bicycle rack 100 extends along a rack axis or cradle plane 150, and light from the light assemblies 130 extend along a light axis or light plane 152. The axes or planes 150, 152 are shown in dashed lines. The cradle plane 150 may be a first plane as discussed above. The light plane 152 may be a third plane that is different than the first plane and the second plane discussed above. The rack axis or cradle plane 150 and the light axis or light plane 152 are separated by an angle β so that light from the light assemblies 130 is not impeded by the bicycle rack 100, when the bicycle rack 100 is in the deployed position as shown. The angle β may be any predetermined angle so that substantially all of the light (e.g., 70 percent or more, 80 percent or more, 90 percent or more, 95 percent or more, or 99 percent or more) from the light assemblies 130 extends under or adjacent to the bicycle rack 100. The angle β may be about 0.5 degrees or more, 1 degree or more, 2 degrees or more, 3 degrees or more, or even 5 degrees or more. The angle β may be about 10 degrees or less, 7 degrees or less, or 6 degrees or less.

Figure 6:
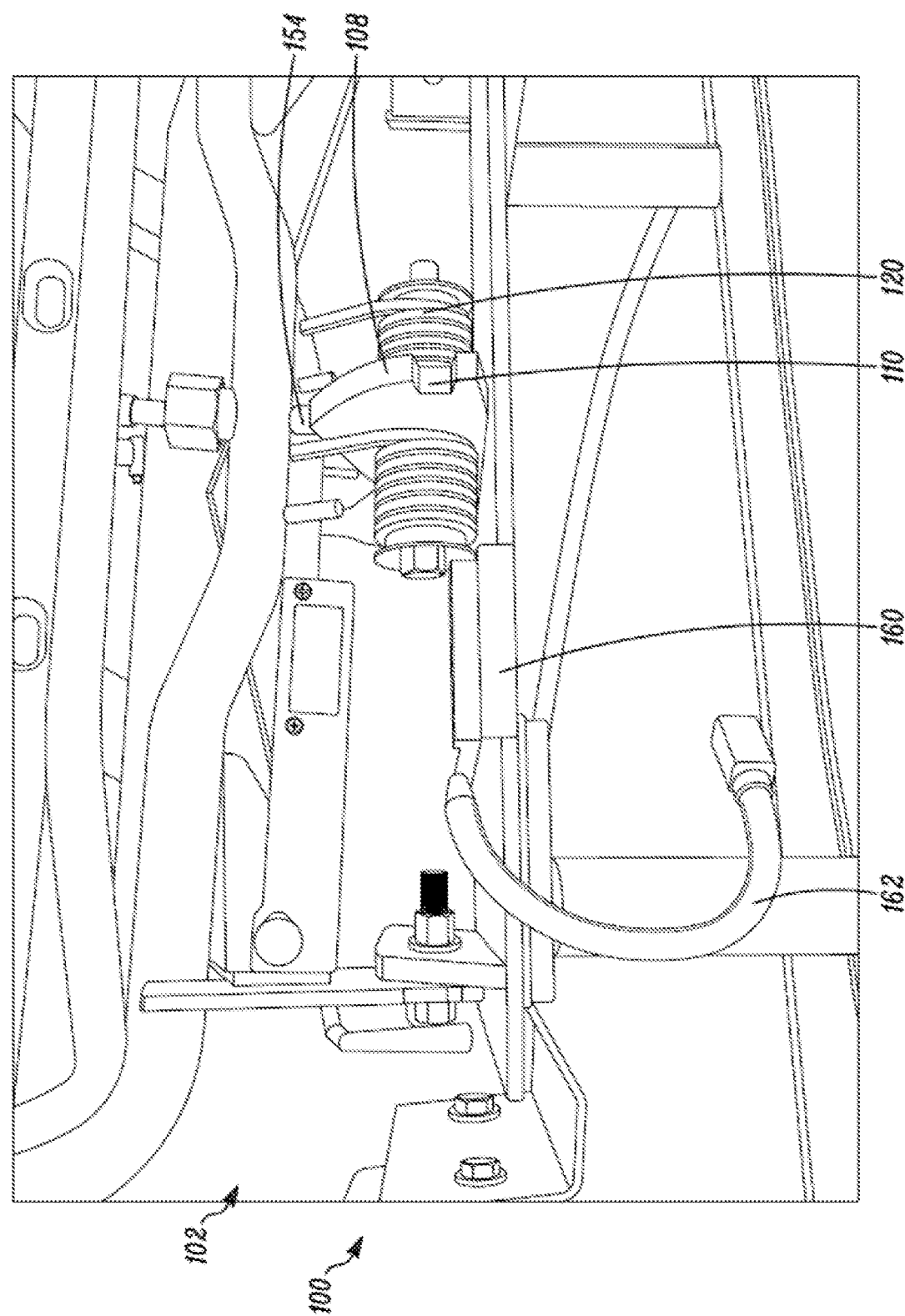
FIG. 6 is close-up view of the bracket assembly of the bicycle rack of FIG. 1.

FIG. 6 is a close-up view of the bracket assembly 102 of FIGS. 1 to 3. The bracket assembly 102 includes the cam 108 with two notches 110. A bottom of the two notches 110 is shown in communication with a locking member 154. When the notches 110 and the locking member 154 are in communication, the bicycle rack (not shown) is prevented from changing positions. The sensor 160 is connected to the bracket assembly 102 and in communication with a sensor harness 162. The sensor harness 162 provides power, signals, or both between the vehicle and the sensor 160 of the bicycle rack 100. The sensor 160 detects when the bicycle rack 100 is in the deployed position, the stored position, or a combination of both. The sensor 160 may indicate to a user that the bicycle rack 100 is in the deployed position, in the deployed position and a bicycle is not on the bicycle rack, or both.

Figure 7:
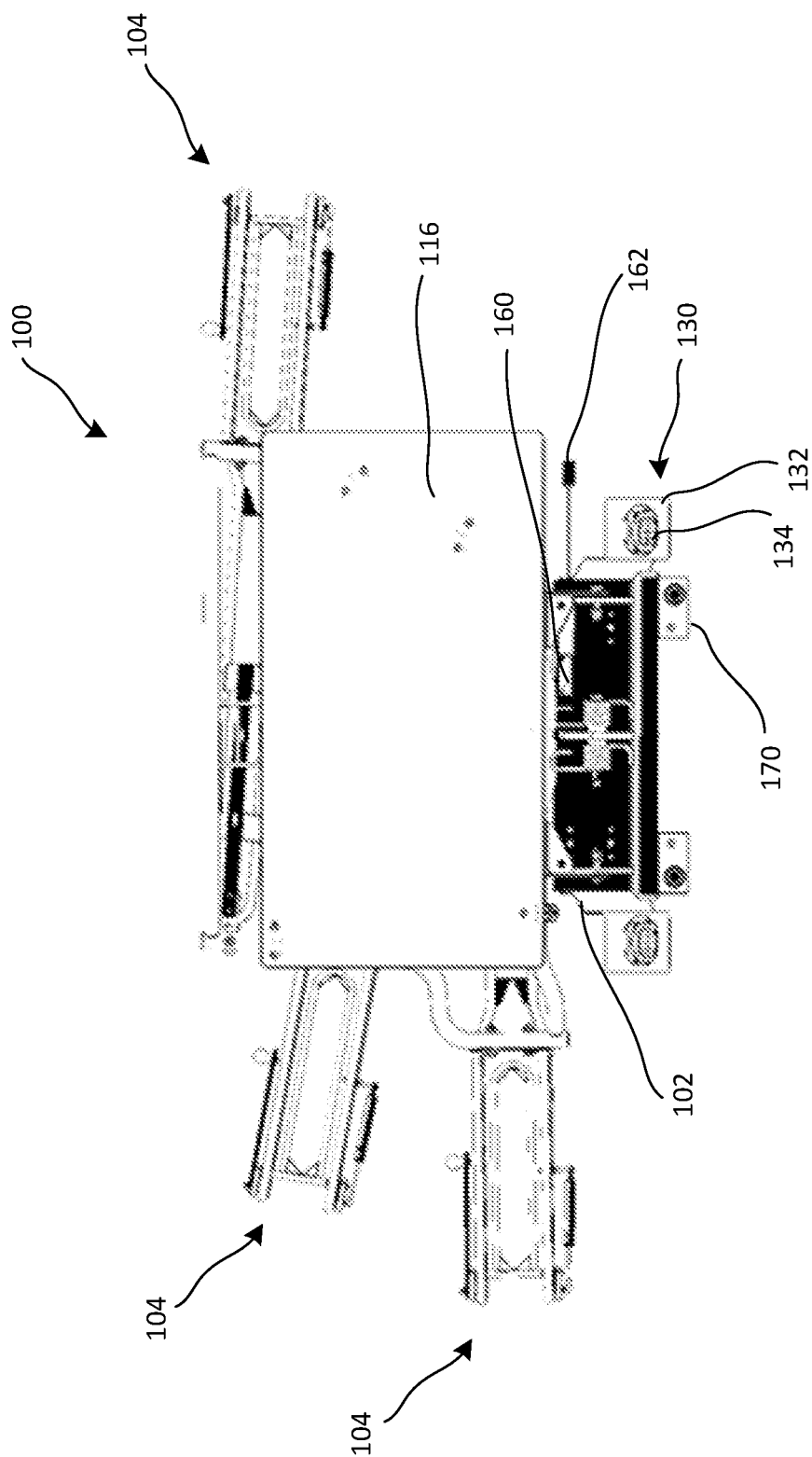
FIG. 7 is a front view of the bracket assembly and the light assembly in a stored position.

FIG. 7 illustrates the bicycle rack 100 in a stored position. In the stored position, the base 116 is rotated about the bracket assembly 102 into a vertical position. The cradles 104 are connected to the bracket assembly 102 and extend outward from the base 116 so that the cradles 104 are located between a vehicle upon which the bicycle rack 100 is installed (not shown) and the base 116. In the stored position, the light assembly 130 is located below the bracket assembly 102 and the base 116. The light assembly 130 includes a light frame 132 that houses one or more lights 134.

The lights 134 may be any light that illuminates regions forward of a vehicle. For example, the lights 134 may illuminate directly in front a vehicle, from a center of the vehicle to a region left of the vehicle, from a center of the vehicle to a region right of the vehicle, or a combination thereof. The lights 134 may be substantially aimed at the ground. The lights 134 may illuminate the ground forward of a vehicle regardless of a position of the bicycle rack 100. For example, the lights 134 may illuminate the ground if the bicycle rack 100 is in the stored position, the deployed position, or a position therebetween. The lights 134 may be a fog light, a standard headlight, an incandescent bulb, a fluorescent light, a compact fluorescent lamp, a halogen lamp, a light emitting diode (LED), high intensity discharge lamps (HID); a halogen light, a xenon light, a laser diode, a phosphorous bulb, or a combination thereof.

The lights 134 may operate when the bicycle rack 100 is in the stored position, the deployed position, a position between the stored position and the deployed position, or a combination thereof. The lights 134 may be activated when the bicycle rack 100 is in the deployed position by the sensor 160 being activated.

The sensor 160 may activate the lights 134, a signal to the driver, or both. The sensor 160 may be connected to the vehicle by the sensor harness 162. The sensor harness 162 may electrically couple the sensor 160 to the vehicle (FIGS. 4-5) so that a signal is provided to the user when the bicycle rack 100 is in a position other than the stored position. The sensor harness 162 may control the lights 134. For example, the sensor 160 can control the lights 134 such that the lights 134 are only on when the bicycle rack 100 is in a position other than the stored position (e.g., the deployed position). The sensor harness 162 may provide power, communications (e.g., signals), controls, or both to the bicycle rack 100. However, the lights 134 may remain on when the vehicle is on. Power may extend through the sensor harness 162 into the bicycle rack 100 that moves the bicycle rack 100 between the stored position and the deployed position, activates the lights 134, provides a signal to a user, or a combination thereof. The sensor harness 162 may power all features of the bicycle rack 100. The sensor harness 162 may plug into a vehicle. The sensor harness 162 may electrically connect the bicycle rack 100 to the vehicle (FIGS. 4 and 5), and a connection member 170 may mechanically connect the bicycle rack 100 to the vehicle (FIGS. 4 and 5).

The connection member 170 may directly connect the bicycle rack 100 to the vehicle (not shown). The connection member 170 may receive a fastener to form a connection (e.g., bolts, nuts, threaded member, a removable member, an integral part of the connection member 170, or a combination thereof). The connection member 170 may extend into a portion of the vehicle (e.g., the frame, a bumper, a chassis). The connection member 170 may allow the bicycle rack 100 to extend in a cantilevered manner or form a cantilevered connection with the vehicle. The connection member 170 may be a through hole, a boss, a hole in a piece of metal, or a combination thereof. The connection member 170 may be part of the bracket assembly 102.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A bicycle rack comprising:
   a base comprising:
      a proximal end located adjacent to a vehicle when the bicycle rack is connected to the vehicle and
      a distal end located away from the vehicle;
   one or more cradles located between the proximal end and the distal end and connected to the base, the one or more cradles are configured to receive a bicycle, wherein the base and the one or more cradles are movable between a stored position and a deployed position and the base extends along a cradle plane from the proximal end to the distal end when the base and the one or more cradles are in the deployed position; and
   one or more light assemblies located adjacent to the base that provide light along a horizontal light plane when the one or more cradles are in the stored position and the deployed position;
   wherein the horizontal light plane and the cradle plane are at an angle relative to one another so that the light within the horizontal light plane extends under the cradle plane in a direction from the proximal end to the distal end.

2. The bicycle rack of claim 1, wherein all or a portion of the one or more cradles are located above and extend substantially parallel to the one or more light assemblies.

3. The bicycle rack of claim 1, further comprising:
   bracket arms and
   cradle arms that assist the bicycle rack in moving between the stored position and the deployed position.

4. The bicycle rack of claim 3, wherein the cradle arms include a contact edge that contacts a wall, and wherein the contact edge determines a position of the one or more cradles and the cradle plane.

5. The bicycle rack of claim 1, wherein the angle between the cradle plane and the horizontal light plane is from 1 degree to 5 degrees.

6. The bicycle rack of claim 1, further comprising one or more sensors.

7. The bicycle rack of claim 6, wherein the one or more sensors sense a position of the bicycle rack, a presence of a bicycle within the bicycle rack, or both.

8. The bicycle rack of claim 1, further comprising:
   one or more bias devices that assist in moving the bicycle rack between the stored position and the deployed position.

9. A bicycle rack comprising:
   a base that is movable between a stored position and a deployed position, the base comprising:
      a proximal end configured to be located adjacent to a vehicle when the bicycle rack is connected to the vehicle;
      a distal end located away from the vehicle and the proximal end;
      one or more cradles connected to the base and extending along a cradle plane between the proximal end and the distal end, wherein the one or more cradles are configured to receive a bicycle; and
      one or more light assemblies located at the proximal end below the one or more cradles, the one or more light assemblies configured to provide light along a horizontal light plane that extends below the one or more cradles and the cradle plane from the proximal end towards the distal end;
   a bracket assembly that is configured to connect the bicycle rack to the vehicle, wherein a first portion of the bracket assembly extends above the base and a second portion of the bracket assembly extends below the base when the base is in the deployed position; and
   one or more sensors that sense a position of the bicycle rack, an operation status of the one or more light assemblies, or both,
   wherein the light extends along the horizontal light plane below the base when then the base is in the stored position and the deployed position.

10. The bicycle rack of claim 9, wherein the one or more sensors detect when the bicycle rack is in the stored position and the one or more cradles are free of bicycles.

11. The bicycle rack of claim 10, wherein the one or more sensors are connected to a sensor harness that provides power, communication, or both to the one or more sensors of the vehicle.

12. The bicycle rack of claim 9, wherein the one or more light assemblies are fog lights.

13. The bicycle rack of claim 9, wherein the bracket assembly is located at the proximal end and is configured to be connected to the vehicle.

14. The bicycle rack of claim 9, further comprising:
one or more bias devices that assist in moving the bicycle rack between the stored position and the deployed position.

15. A bicycle rack comprising:
a proximal end located adjacent to a vehicle;
a distal end located away from the vehicle and the proximal end;
one or more cradles that are configured to receive a bicycle, the one or more cradles located between the proximal end and the distal end and extending along a cradle plane;
a bracket assembly located at the proximal end and configured to directly connect the bicycle rack to the vehicle and movably support the one or more cradles extending from the bracket assembly;
a base that is movable between a stored position and a deployed position, wherein a first portion of the bracket assembly extends above the base and a second portion of the bracket assembly extends below the base when the base is in the deployed position; and
one or more light assemblies located at the proximal end and directly connected to the bracket assembly and extending coplanar with the bracket assembly to provide light along a horizontal light plane from the proximal end to the distal end under the one or more cradles,
wherein the light extends along the horizontal light plane under the base when the base is in the stored position and the deployed position.

16. The bicycle rack of claim 15, wherein the one or more light assemblies are located below the base when the base is in the deployed position.

17. The bicycle rack of claim 15, further comprising:
one or more sensors in communication with the one or more light assemblies.

18. The bicycle rack of claim 15, further comprising:
one or more cams that assist in moving the bicycle rack between the stored position and the deployed position.

19. The bicycle rack of claim 18, wherein the one or more cams are in communication with one or more bias devices that assist in moving the bicycle rack between the stored position and the deployed position.

20. The bicycle rack of claim 18, wherein the one or more cams comprise one or more notches and the one or more notches assist in retaining the bicycle rack in the stored position and the deployed position.

\* \* \* \* \*